(12) United States Patent
Haigh

(10) Patent No.: US 10,263,011 B1
(45) Date of Patent: *Apr. 16, 2019

(54) PROCESS FOR MAKING ICS FROM STANDARD LOGIC CELLS THAT UTILIZE TS CUT MASK(S) AND AVOID DFM PROBLEMS CAUSED BY CLOSELY SPACED GATE CONTACTS AND TSCUT JOGS

(71) Applicant: PDF Solutions, Inc., San Jose, CA (US)

(72) Inventor: Jonathan Haigh, Pittsburgh, PA (US)

(73) Assignee: PDF Solutions, Inc., Santa Clara, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/712,723

(22) Filed: Sep. 22, 2017

Related U.S. Application Data

(63) Continuation of application No. 15/712,686, filed on Sep. 22, 2017, now Pat. No. 9,984,970.

(51) Int. Cl.
*G06F 17/50* (2006.01)
*H01L 27/02* (2006.01)
*H01L 23/522* (2006.01)
*H01L 27/118* (2006.01)

(52) U.S. Cl.
CPC .... *H01L 27/11807* (2013.01); *G06F 17/5077* (2013.01); *H01L 23/5226* (2013.01); *H01L 27/0207* (2013.01); *H01L 2027/11837* (2013.01); *H01L 2027/11887* (2013.01)

(58) Field of Classification Search
CPC .......................... H01L 23/528; G06F 17/5068
See application file for complete search history.

(56) References Cited

U.S. PATENT DOCUMENTS

| | | |
|---|---|---|
| 9,461,065 B1 | 10/2016 | Haigh |
| 9,529,954 B1 | 12/2016 | Haigh |
| 9,595,536 B1 | 3/2017 | Haigh |
| 9,627,498 B2 | 4/2017 | Chiou et al. |

*Primary Examiner* — Vuthe Siek
*Assistant Examiner* — Aric Lin
(74) *Attorney, Agent, or Firm* — David Garrod

(57) ABSTRACT

An improved standard cell chip, library and/or process ensures that there is adequate spacing between TSCUT jogs and nearby gate contacts to avoid inadvertent shorts/leakages that can degrade manufacturing yield or performance.

6 Claims, 10 Drawing Sheets

PROCESS FOR MAKING ICS FROM STANDARD LOGIC CELLS THAT UTILIZE TS CUT MASK(S) AND AVOID DFM PROBLEMS CAUSED BY CLOSELY SPACED GATE CONTACTS AND TSCUT JOGS

MASK WORK NOTICE

A portion of the disclosure of this patent document contains material which is subject to mask work protection, *M*, PDF Solutions, Inc. The mask work owner (PDF Solutions, Inc.) has no objection to the facsimile reproduction by anyone of the patent document or the patent disclosure, as it appears in the Patent and Trademark Office patent file or records, but otherwise reserves all mask work rights whatsoever.

FIELD OF THE INVENTION

This invention relates to design for manufacturability (DFM) of standard cells for advanced semiconductor processes (e.g., 10 nm, 7 nm, 5 nm) that utilize one or more TS cut mask(s), to libraries containing such cells, and to wafers/chips that contain instances of such cells.

BACKGROUND OF THE INVENTION

As semiconductor processes advance to render increasingly smaller features, the design of dense, high-yielding (manufacturable) cells becomes increasingly challenging. See, e.g., U.S. Pat. No. 9,202,820, "Flip-flop, latch, and mux cells for use in a standard cell library and integrated circuits made therefrom," to the inventor herein.

In the most advanced processes, patterning of critical layers is typically restricted to one direction (unidirectional) in each layer, delimited by cut masks, with the cut masks increasingly multi-patterned. In such technologies, careful attention to often non-obvious potential manufacturability problems is critical to successful implementation of a standard cell library. This inventor's prior U.S. Pat. No. 9,461,065 ("Standard cell library with DFM-optimized M0 cuts and V0 adjacencies"), incorporated by reference herein, provides an example of a DFM-optimized standard cell library for use in such advanced semiconductor processes.

SUMMARY OF THE INVENTION

One aspect of the invention relates to a library of DFM-improved standard cells, optimized for use in advanced semiconductor processes that include one or more silicide cut (TSCUT) mask(s).

Another aspect of the invention relates to wafers, chips, and systems that include such DFM-improved cells.

With the present invention, applicant has recognized a potentially yield-impairing construct that can arise from jogs (as drawn) in a TSCUT mask. This previously unknown problem is best illustrated in FIGS. 2C and 2CC, and an exemplary solution is shown in FIGS. 3A-D. The fact that this problem was unknown and not obvious to persons skilled in the art is apparent from the fact that the configuration is permitted under presently existing design rules.

Accordingly, generally speaking, and without intending to be limiting, one aspect of the invention relates to integrated circuits (ICs), formed from a process that utilizes at least an n-well (NW) mask, a source/drain (RX) mask, a gate (PC) mask, a gate cut (CT) mask, a source/drain silicide (TS) mask, a silicide cut (TSCUT) mask, a source/drain contact (CA) mask, a gate contact (GO) mask, a local interconnect (M0) mask, an M0 cut (M0CUT) mask, a first interconnect via (V0) mask, and a first interconnect layer (M1) mask, such ICs including, for example: at least 1,000 (or preferably at least 10,000, or more preferably at least 100,000) standard logic cells, implementing at least 20 (or preferably at least 50, or more preferably at least 70) distinct logical functions; where each of said standard logic cells is formed, at least in part, from: identically spaced power rails that extend longitudinally in a first direction; identically spaced gate stripes that extend longitudinally in a second direction, perpendicular to the first direction, with adjacent gate stripes having a center-to-center perpendicular spacing of CPP; only four or fewer M0 wiring tracks, extending longitudinally in the first direction, between each pair of adjacent power rails; and additional patterning formed using one or more NW, RX, CT, TS, TSCUT, CA, GO, and M0CUT masks; where each of the standard logic cells is configured to permit abutted instantiation with others of the standard logic cells; and where each of the standard logic cells is further characterized in that: for any and all gate contact(s) formed by a GO mask feature that partially overlaps a TSCUT mask, the distance from the center point of the GO mask feature to the nearest jog in the TSCUT mask is at least 0.5×CPP. In some embodiments, the distance from the center point of the GO mask feature to the nearest jog in the TSCUT mask is at least 0.8×CPP, or at least CPP. Such ICs may take the form of a silicon wafer, an unpackaged silicon die, or a packaged chip.

Again, generally speaking, and without intending to be limiting, another aspect of the invention relates to processes for making ICs, through use of at least an n-well (NW) mask, a source/drain (RX) mask, a gate (PC) mask, a gate cut (CT) mask, a source/drain silicide (TS) mask, a silicide cut (TSCUT) mask, a source/drain contact (CA) mask, a gate contact (GO) mask, a local interconnect (M0) mask, an M0 cut (M0CUT) mask, a first interconnect via (V0) mask, and a first interconnect layer (M1) mask, such processes including, for example, at least the following steps: instantiating at least 1,000 (or preferably at least 10,000, or more preferably at least 100,000) standard logic cells, implementing at least 20 (or preferably at least 50, or more preferably at least 70) distinct logical functions, by, for each of the cells: patterning identically spaced power rails that extend longitudinally in a first direction; patterning identically spaced gate stripes that extend longitudinally in a second direction, perpendicular to the first direction, with adjacent gate stripes having a center-to-center perpendicular spacing of CPP; patterning only four or fewer M0 wiring tracks, extending longitudinally in the first direction, between each pair of adjacent power rails; and patterning additional features using one or more NW, RX, CT, TS, TSCUT, CA, GO, and M0CUT masks; such steps producing standard logic cells that are each configured to permit abutted instantiation with others of the standard logic cells; and such steps also producing standard logic cells further characterized in that: for any and all gate contact(s) formed by a GO mask feature that partially overlaps a TSCUT mask, the distance from the center point of said GO mask feature to the nearest jog in the TSCUT mask is at least 0.5×CPP. In some embodiments, the distance from the center point of said GO mask feature to the nearest jog in the TSCUT mask is at least 0.8×CPP, or at least CPP. Such processes may produce an IC in the form of a silicon wafer, an IC in the form of an unpackaged silicon die, or an IC in the form of a packaged chip.

BRIEF DESCRIPTION OF THE DRAWINGS

The above, as well as other, aspects, features and advantages of the present invention are illustrated in the accompanying set of figures, which are rendered to relative scale, and in which.

DESCRIPTION OF EXEMPLARY EMBODIMENT(S)

Referring generally to FIGS. 2A-D and 3A-D, the "A" labeled figures show all depicted layers (i.e., M1, V0, M0CUT, M0, GO, CA, TSCUT, TS, CT, PC, RX, NW), the "B" labeled figures show the FEOL layers (i.e., CT, PC, RX, NW), the "C" labeled figures show the MOL layers (i.e., GO, CA, TSCUT, TS), and the "D" labeled figures show the BEOL layers (i.e., M1, V0, M0CUT, M0). Note that PC and OUTLINE (a non-printing layer) are shown on all figures, for ease of reference.

Figure 1:
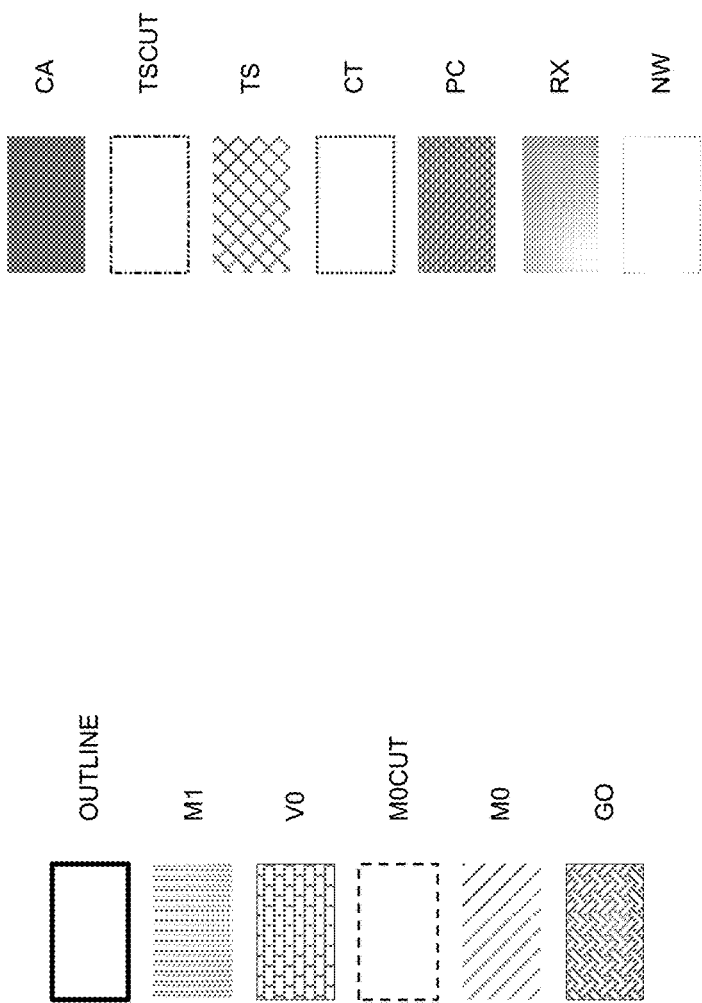
FIG. 1 contains a legend for the figures that follow.
Figure 2A:
FIGS. 2A-D and 2CC show various views of an exemplary layout for a scan-enabled D flip-flop with inverted output; and, FIGS. 3A-D show various views of an improved layout for the same flip-flop that satisfies the principles of the present invention.
Figure 2B:
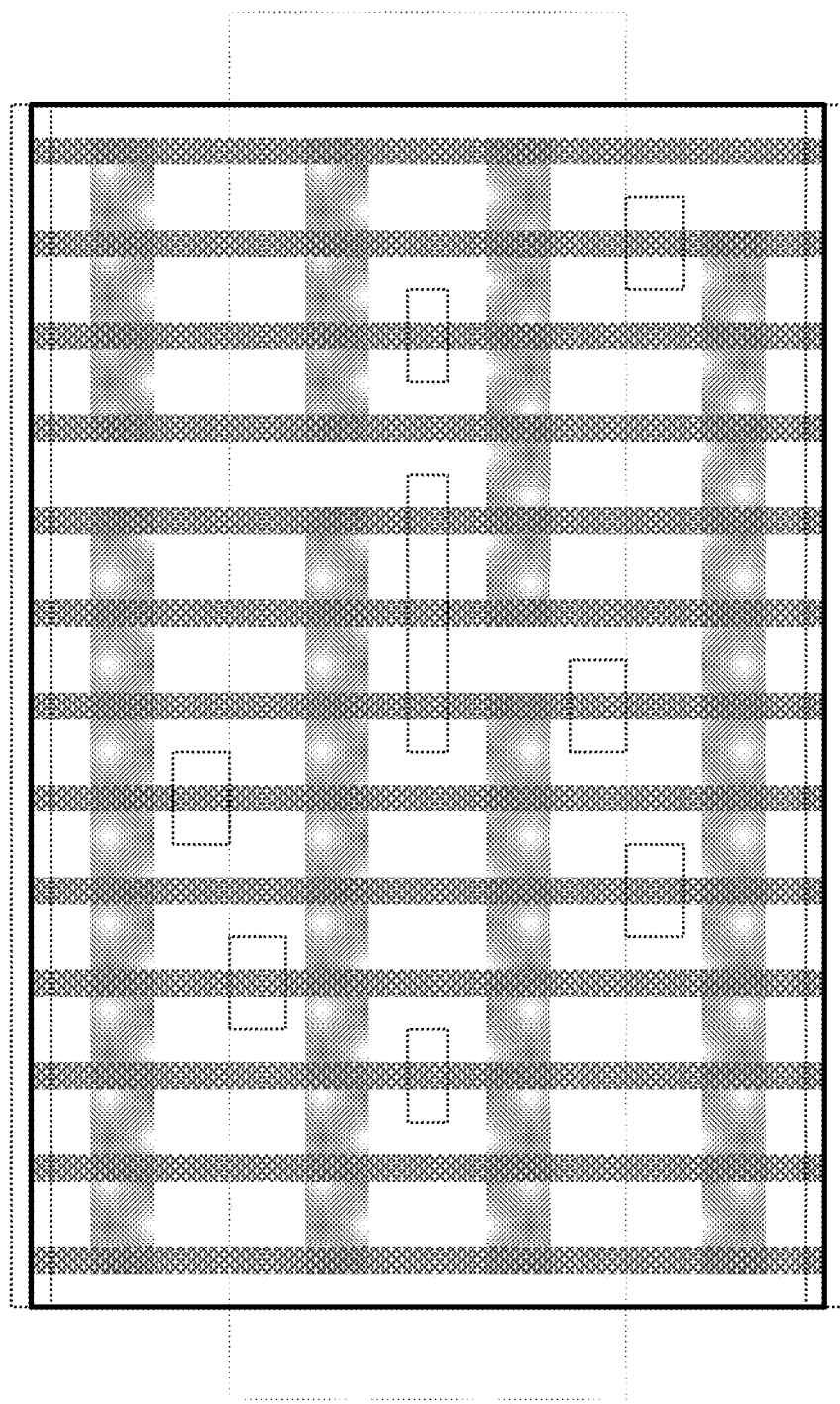
Figure 2C:
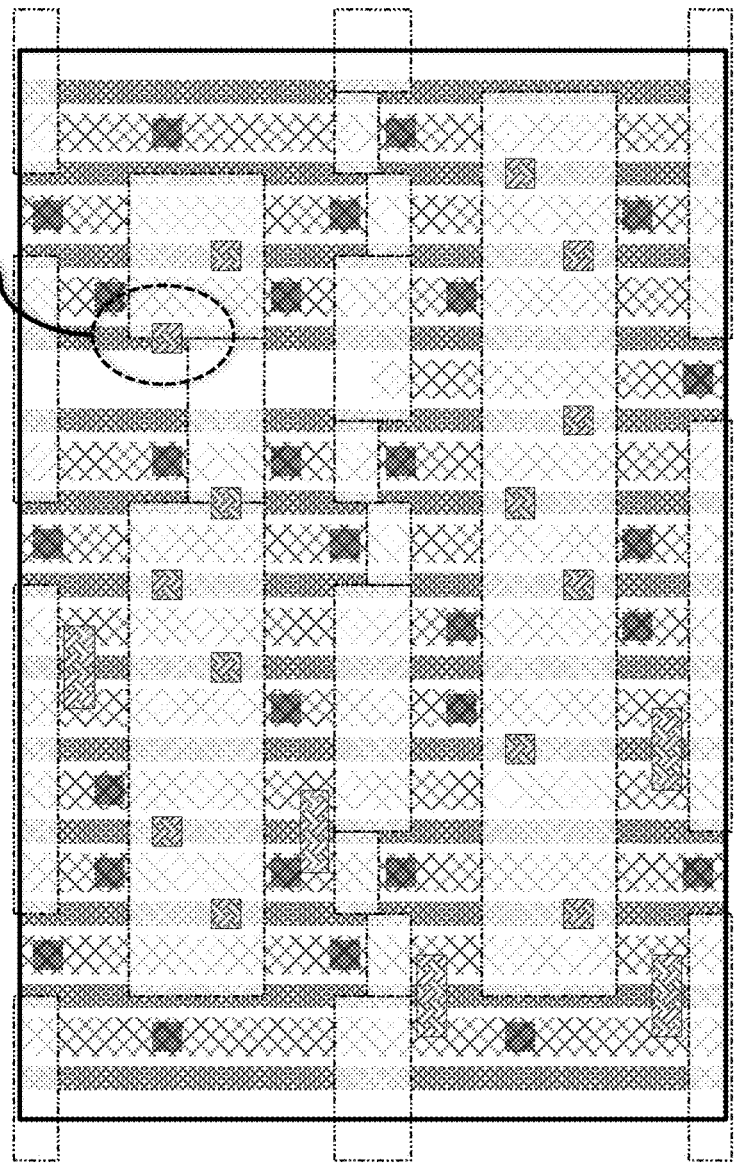
Figure 2C:
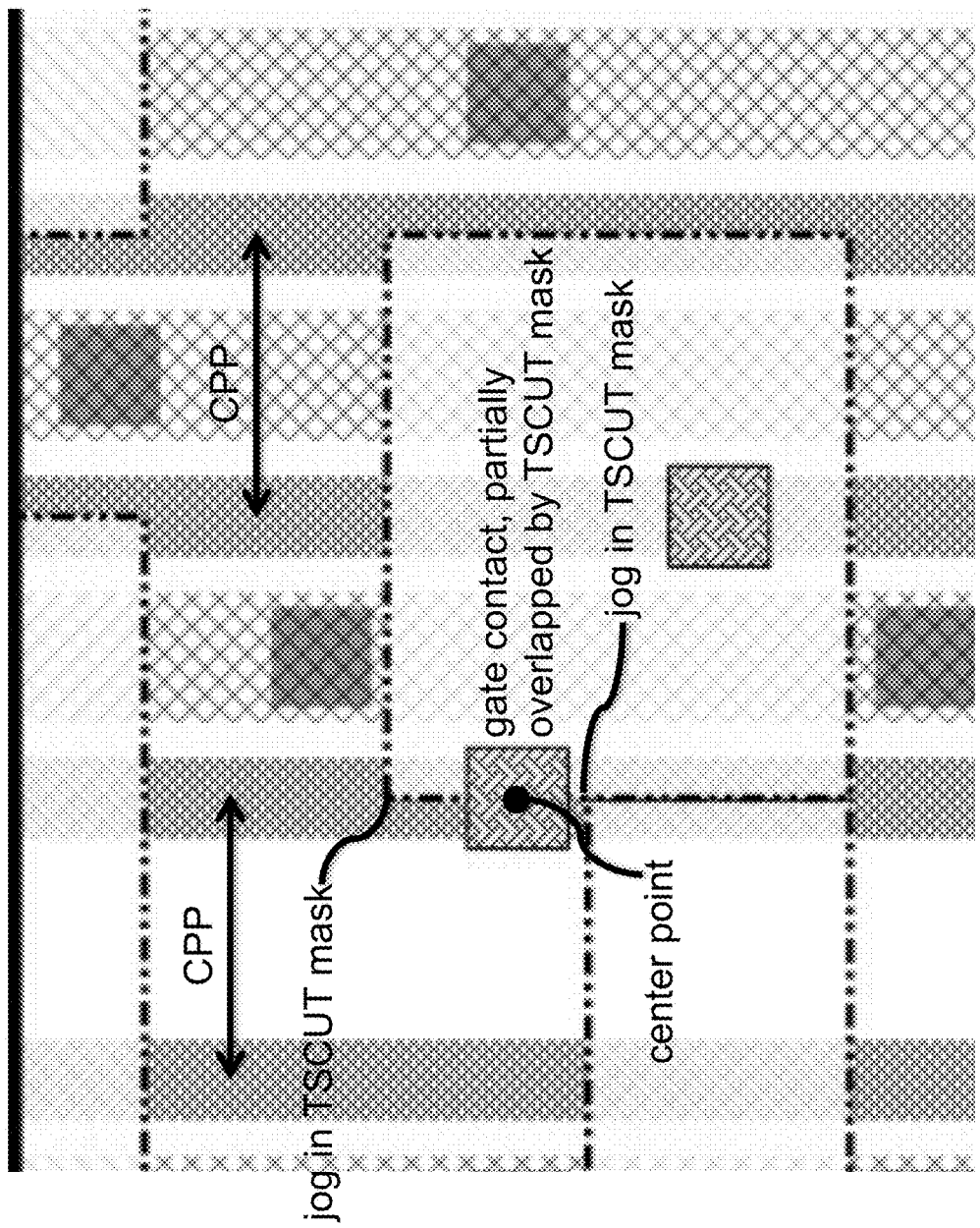
Figure 2D:
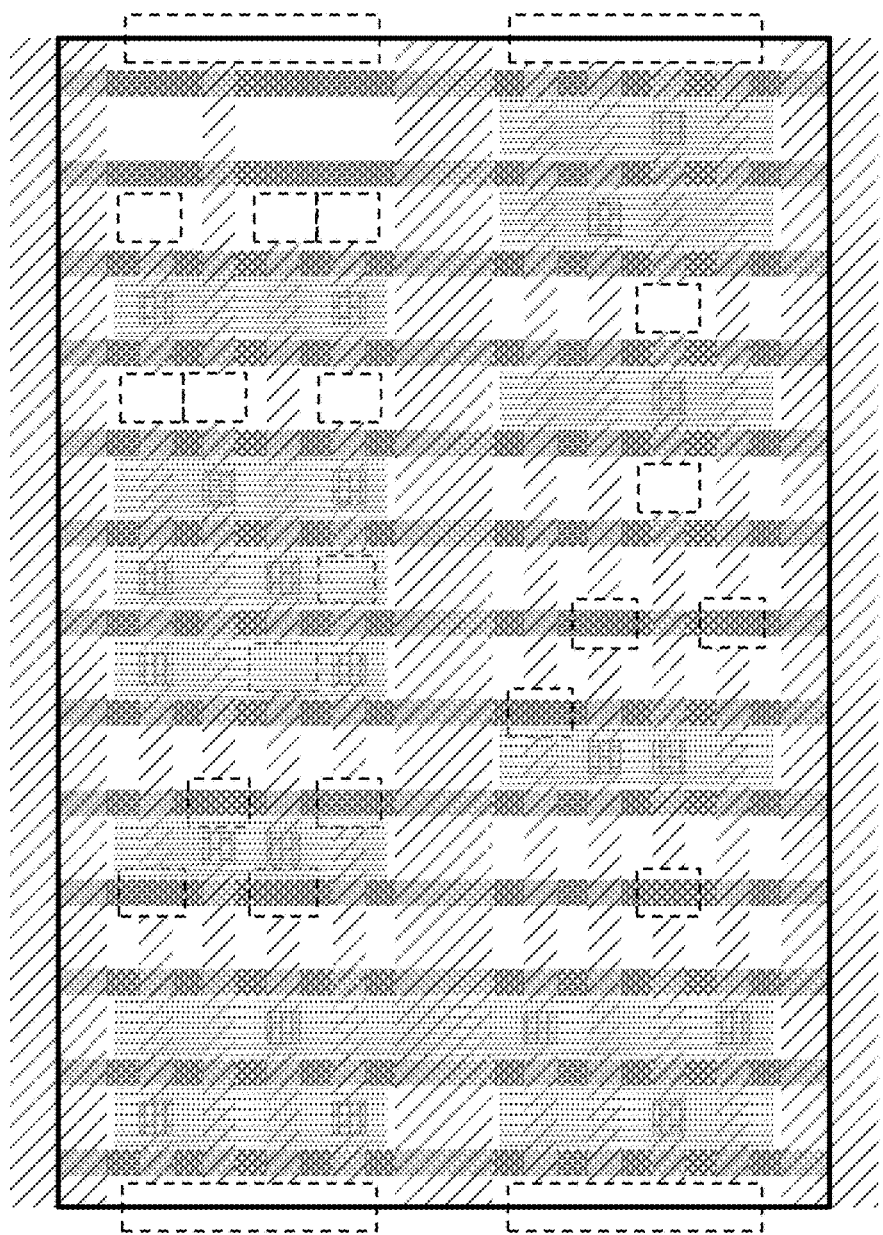
Figure 3A:
Figure 3B:
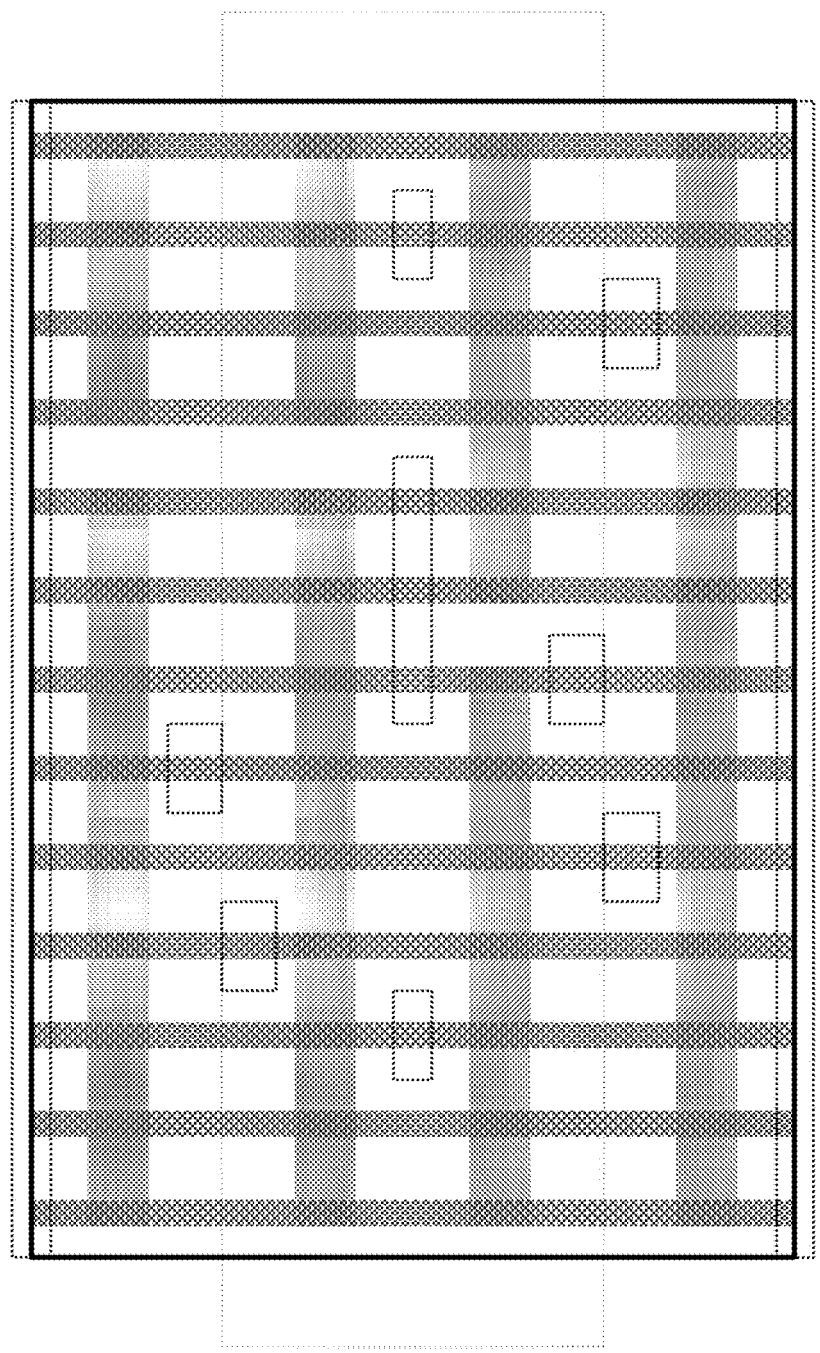
Figure 3C:
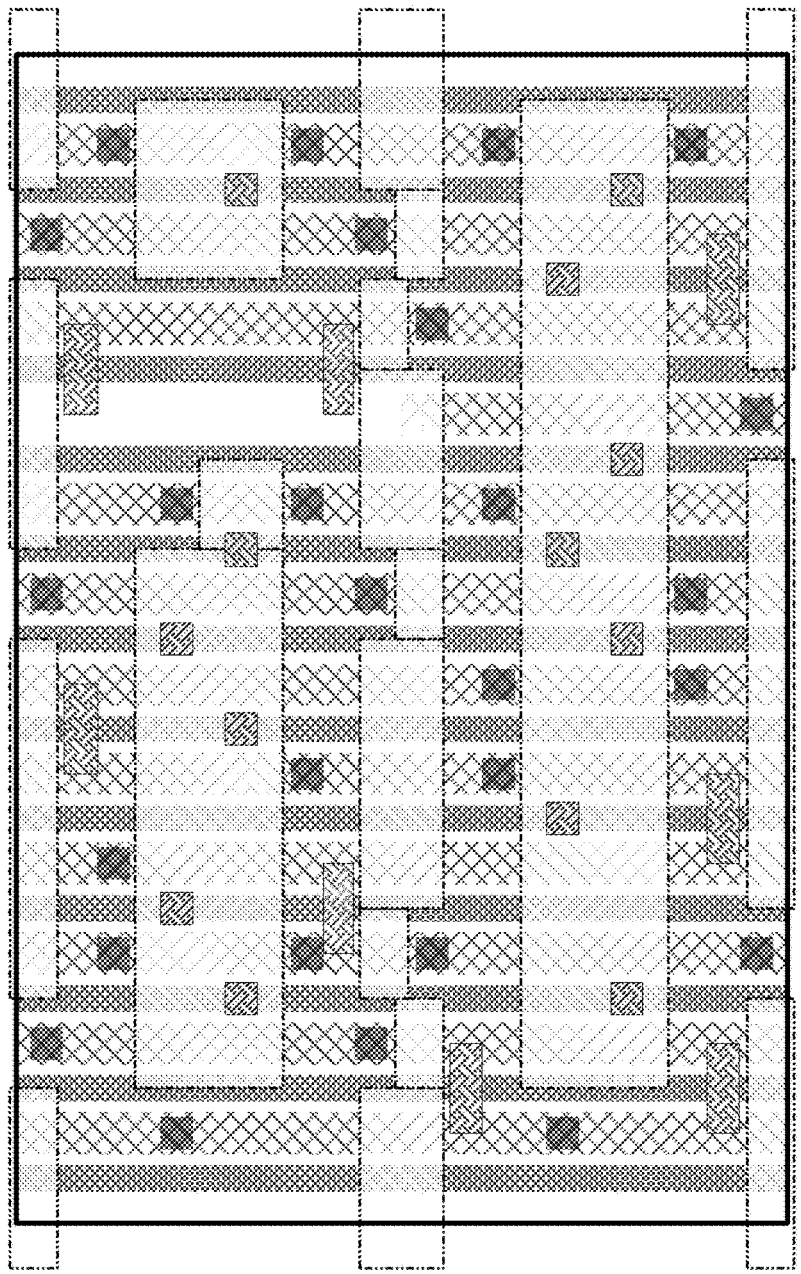
Figure 3D:
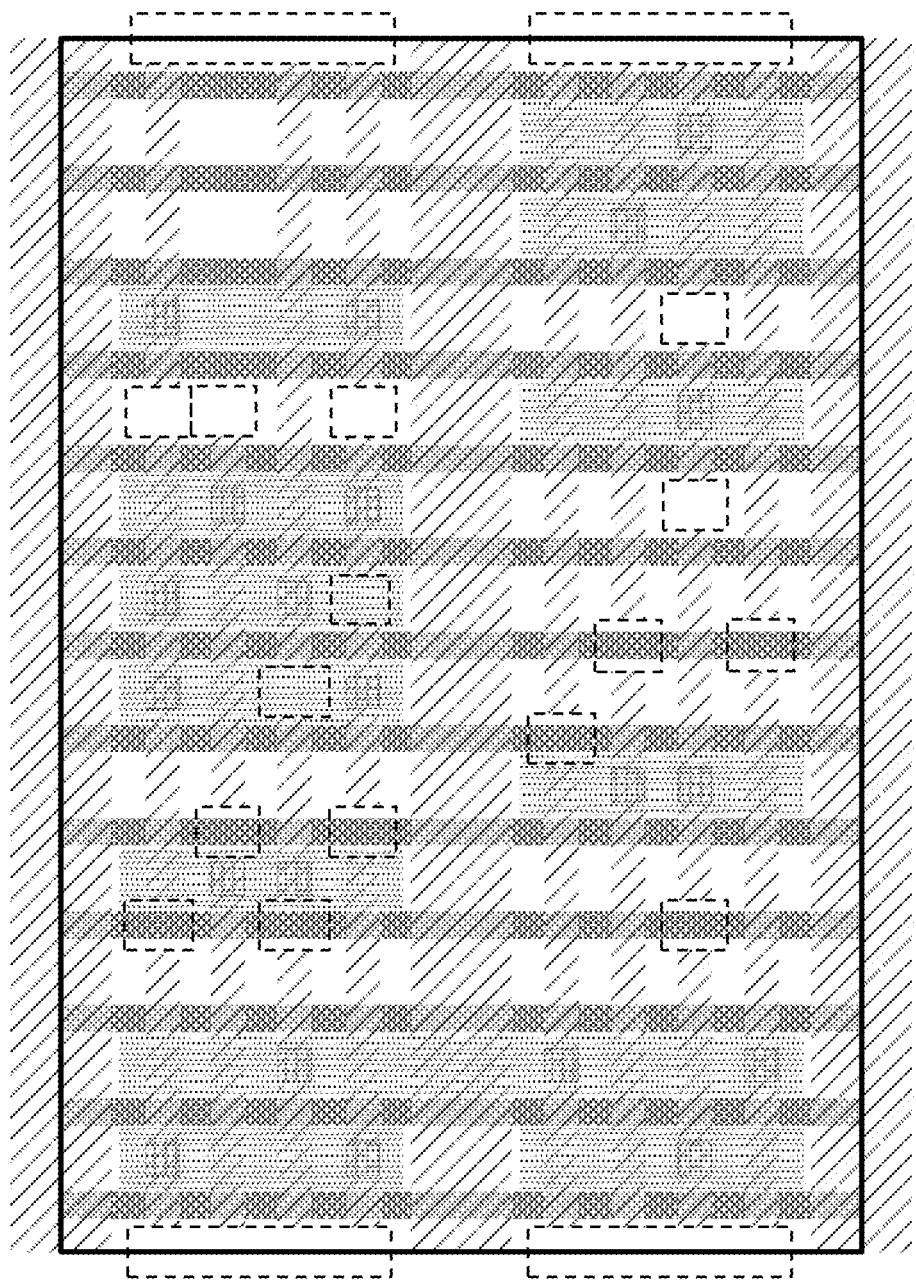

Referring now to the flip-flop depicted in FIGS. 2A-D, and specifically to FIG. 2CC (which is a blow-up of the critical portion of 2C), applicant has discovered that the annotated configuration can lead to substantial yield degradation because the TSCUT jog, after OPC and physical processing, produces a curved, rather than sharp, boundary that may result in inadequate etching of the underlying TS patterning. As a result, the gap between the gate contact and under-etched TS may be inadequate and produce an unintended short or leakage between the two.

FIGS. 3A-D show a revision of the layout to avoid the problematic configuration. As one skilled in the art will appreciate, once the problem is explained (as per FIG. 2C, for example), it is straightforward to create/modify cells to avoid the problem and create an entire library that complies with the instant invention.

Additional cells to fill out the library, in accordance with the present invention, can be created by modifying the layouts provided in the incorporated '065 patent to include a TSCUT mask, with appropriate spacing, as described above. Examples of such additional library cells include:

1. the logic function of a 2-input AND;
2. the logic function of a 3-input AND;
3. the logic function of a 4-input AND;
4. the logic function OR(AND(a,b),c);
5. the logic function OR(AND(a,b,c),d);
6. the logic function OR(AND(a,b),c,d);
7. the logic function NOT(OR(AND(a,b),c));
8. the logic function NOT(OR(AND(a,b),AND(c,d)));
9. the logic function NOT(OR(AND(a,b,c),d));
10. the logic function NOT(OR(AND(a,b),c,d));
11. the logic function NOT(OR(AND(a,b),AND(c,d),AND(e,f)));
12. the logic function of a buffer;
13. the logic function of a clock-gating latch;
14. the logic function of a delay gate;
15. the logic function of a full adder;
16. the logic function of a half adder;
17. the logic function NOT(OR(AND(a,b),c)), with one of its inputs inverted;
18. the logic function of a 2-input NAND, with one of its inputs inverted;
19. the logic function of a 3-input NAND, with one of its inputs inverted;
20. the logic function of a 2-input NOR, with one of its inputs inverted;
21. the logic function of a 3-input NOR, with one of its inputs inverted;
22. the logic function of an inverter;
23. the logic function NOT(AND(OR(a,b),c)), with one of its inputs inverted;
24. the logic function of a latch;
25. the logic function of a 2-input MUX;
26. the logic function of a 2-input MUX, with one of its inputs inverted;
27. the logic function of a 2-input NAND;
28. the logic function of a 3-input NAND;
29. the logic function of a 4-input NAND;
30. the logic function of a 2-input NOR;
31. the logic function of a 3-input NOR;
32. the logic function of a 4-input NOR;
33. the logic function AND(OR(a,b),c);
34. the logic function AND(OR(a,b,c),d);
35. the logic function AND(OR(a,b),c,d);
36. the logic function NOT(AND(OR(a,b),c));
37. the logic function NOT(AND(OR(a,b),OR(c,d)));
38. the logic function NOT(AND(OR(a,b,c),d));
39. the logic function NOT(AND(OR(a,b),c,d));
40. the logic function NOT(AND(OR(a,b),OR(c,d),OR(e,f)));
41. the logic function of a 2-input OR;
42. the logic function of a 3-input OR;
43. the logic function of a 4-input OR;
44. the logic function of a scan-enabled D flip-flop;
45. the logic function of a scan-enabled D flip-flop, with set and reset;
46. the logic function 1;
47. the logic function 0;
48. the logic function of a 2-input XNOR; and/or,
49. the logic function of a 2-input XOR.

What is claimed in this application is:

1. A process for making an integrated circuit (IC) through use of at least an n-well (NW) mask, a source/drain (RX) mask, a gate (PC) mask, a gate cut (CT) mask, a source/drain silicide (TS) mask, a silicide cut (TSCUT) mask, a source/drain contact (CA) mask, a gate contact (GO) mask, a local interconnect (M0) mask, an M0 cut (M0CUT) mask, a first interconnect via (V0) mask, and a first interconnect layer (M1) mask, said process including:

instantiating at least 1000 standard logic cells, implementing at least 20 distinct logical functions, by, for each of said cells:

patterning identically spaced power rails that extend longitudinally in a first direction;

patterning identically spaced gate stripes that extend longitudinally in a second direction, perpendicular to the first direction, with adjacent gate stripes having a center-to-center perpendicular spacing of CPP;

patterning four or fewer M0 wiring tracks, extending longitudinally in the first direction, between each pair of adjacent power rails; and, patterning additional features using one or more NW, RX, CT, TS, TSCUT, CA, GO, and M0CUT masks;

such that each of said standard logic cells is configured to permit abutted instantiation with others of said standard logic cells;

each of said standard logic cells further characterized in that:
  for any and all gate contact(s) formed by a GO mask feature that partially overlaps a TSCUT mask, the distance from the center point of said GO mask feature to the nearest jog in the TSCUT mask is at least 0.5×CPP.

2. A process, as defined in claim 1, wherein each of said standard logic cells is further characterized in that
  for any and all gate contact(s) formed by a GO mask feature that partially overlaps a TSCUT mask, the distance from the center point of said GO mask feature to the nearest jog in the TSCUT mask is at least 0.8×CPP.

3. A process, as defined in claim 2, wherein each of said standard logic cells is further characterized in that
  for any and all gate contact(s) formed by a GO mask feature that partially overlaps a TSCUT mask, the distance from the center point of said GO mask feature to the nearest jog in the TSCUT mask is at least CPP.

4. A process, as defined in claim 1, wherein the process produces an IC in the form of a silicon wafer.

5. A process, as defined in claim 1, wherein the process produces an IC in the form of an unpackaged silicon die.

6. A process, as defined in claim 1, wherein the process produces an IC in the form of a packaged chip.

* * * * *